(No Model.)

L. V. BRILLIÉ.
ELECTRIC METER.

No. 479,932. Patented Aug. 2, 1892.

WITNESSES:
Fred White
C. K. Fraser.

INVENTOR:
Lucien Victor Brillié
By his Attorneys:
Arthur C. Fraser (No Model.)  L. V. BRILLIÉ.  4 Sheets—Sheet 2.
ELECTRIC METER.

No. 479,932.  Patented Aug. 2, 1892.

WITNESSES
Fred White
C. K. Fraser.

INVENTOR.
Lucien Victor Brillié
By his Attorneys
Arthur C. Fraser & Co.

(No Model.)　　　　　L. V. BRILLIÉ.　　　4 Sheets—Sheet 3.
ELECTRIC METER.

No. 479,932.　　　　　　　Patented Aug. 2, 1892.

WITNESSES:
Fred White
C. K. Fraser.

INVENTOR:
Lucien Victor Brillié
By his Attorneys
Arthur C. Fraser & Co.

(No Model.)

L. V. BRILLIÉ.
ELECTRIC METER.

No. 479,932.   Patented Aug. 2, 1892.

4 Sheets—Sheet 4.

WITNESSES:
Fred White
C. K. Fraser.

INVENTOR:
Lucien Victor Brillié
By his Attorneys
Arthur C. Fraser

UNITED STATES PATENT OFFICE.

LUCIEN VICTOR BRILLIÉ, OF PARIS, FRANCE, ASSIGNOR TO THE COMPAGNIE ANONYME CONTINENTALE POUR LA FABRICATION DES COMPTEURS À GAZ ET AUTRES APPAREILS.

ELECTRIC METER.

SPECIFICATION forming part of Letters Patent No. 479,932, dated August 2, 1892.

Application filed October 2, 1891. Serial No. 407,545. (No model.)

*To all whom it may concern:*

Be it known that I, LUCIEN VICTOR BRILLIÉ, a citizen of the Republic of France, residing in Paris, France, have invented certain new and useful Improvements in Electric Meters, of which the following is a specification.

This invention relates to that class of electric meters termed "motor-meters," which include a motor mechanism moving at a speed proportional to the electro-motive force to be measured. The meters of known construction working according to this system are generally composed of an electromotor the inducing and induced parts of which are arranged on the circuit to be measured. The motor is connected to a magnetic retarder or other brake, so that the speed is made proportionate to the electro-motive force of the current. With such a meter the motor-measuring apparatus has to overcome passive resistance, such as the friction of bearings, of the commutator-brushes, the counter air resistance, &c., which give rise to error that may be considerable for low speeds. In the meter of this kind, which forms the subject of the present invention, the current to be measured passes through an electro-dynamometer, and the motor is actuated by a current from any source—such, for example, as a shunt-current from the main current. The speed of the motor is regulated by a current-regulator controlled by the electro-dynamometer. By this arrangement all causes of error such as above indicated can be obviated, as will be shown later on.

I will proceed to describe the improved meter with reference to the accompanying drawings, in which—

Figure 1:
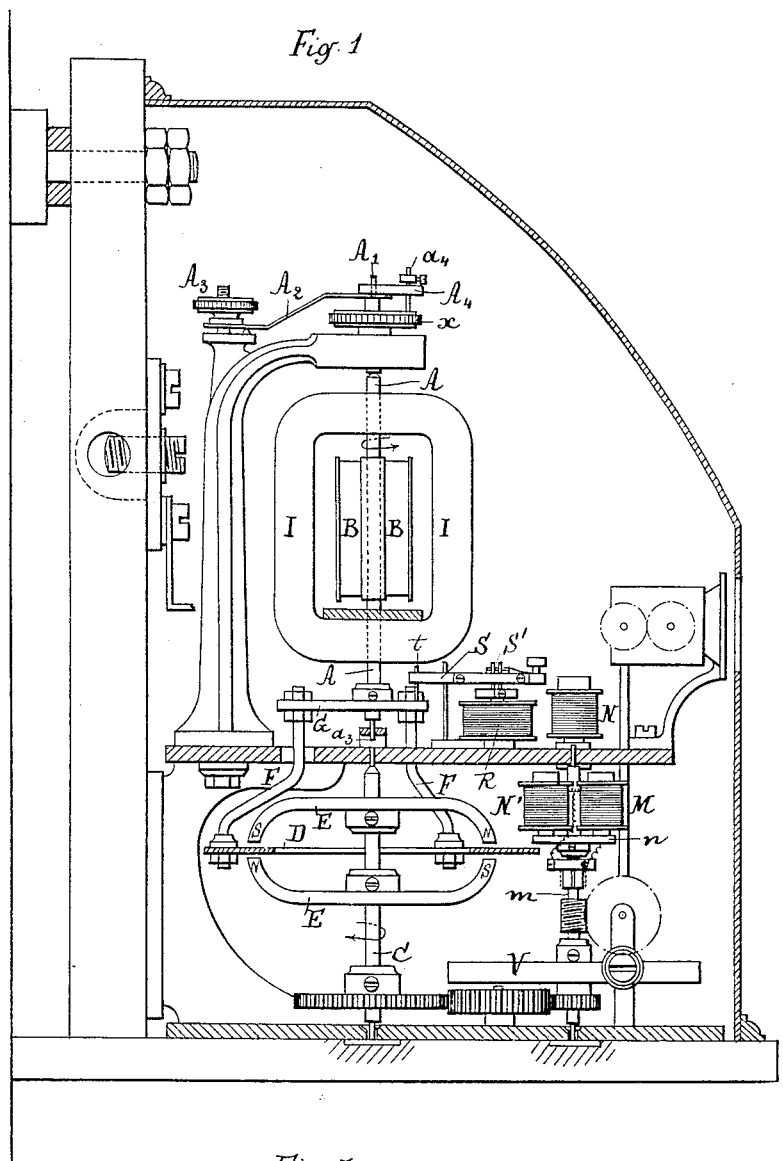
Figure 5:
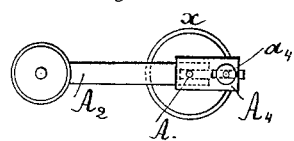
Figure 2:
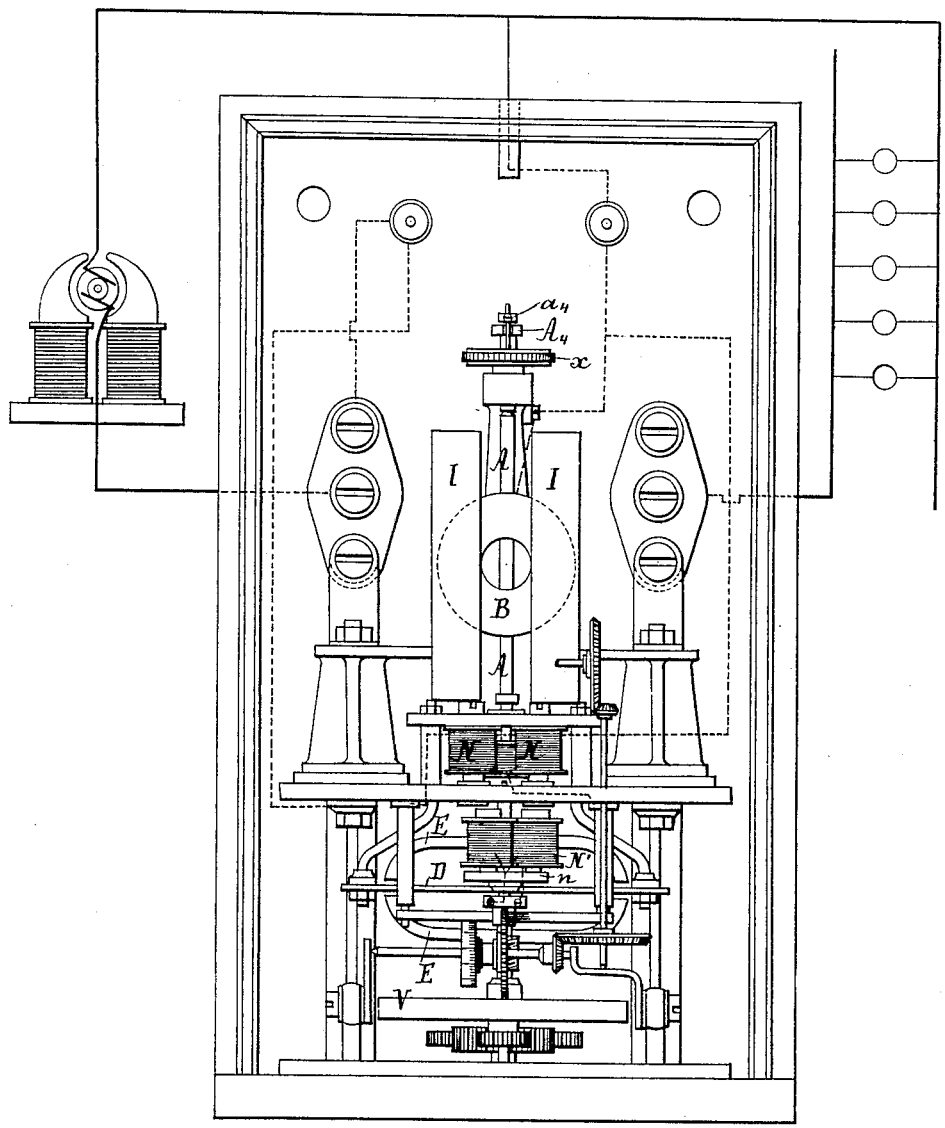
Figure 3:
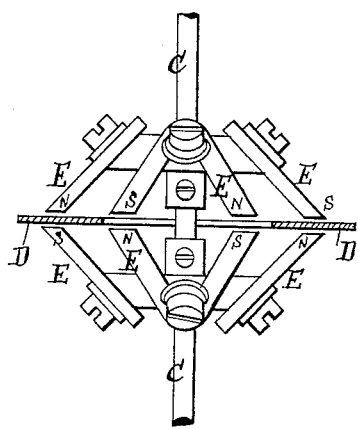
Figure 6:
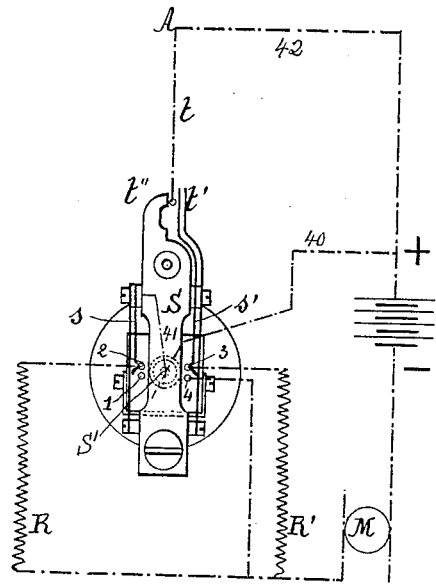
Figure 9:
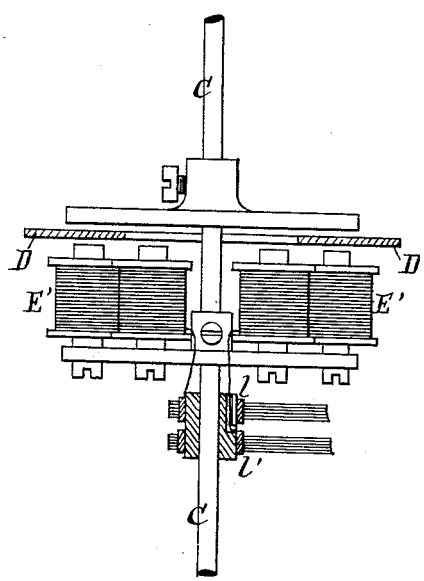
Figure 7:
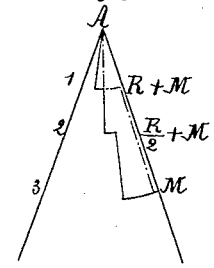
Figure 8:
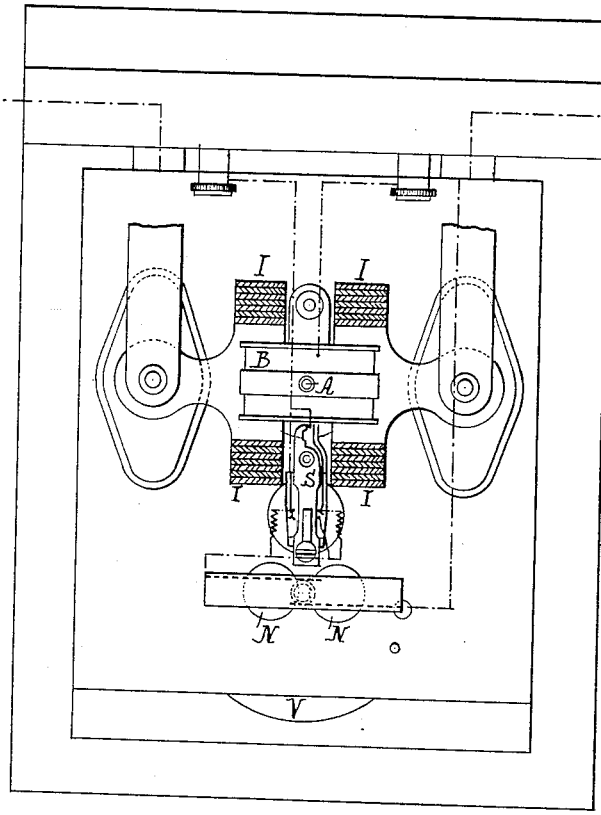
Figure 4:
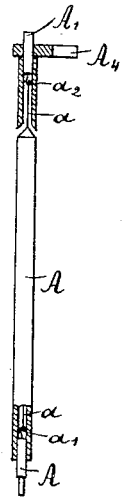

Figure 1 is a vertical section viewed from the side. Fig. 2 is a front elevation. Fig. 3 is a fragmentary vertical section showing another construction of retarder-magnets. Fig. 4 is a detail view of the axis of the electro-dynamometer partly in section. Fig. 5 is a plan of part of the apparatus shown in Fig. 1. Fig. 6 is a plan and circuit diagram of the circuit-closer operated by the electro-dynamometer. Fig. 7 is a diagram of the strength of current through the motor under different conditions. Fig. 8 is a sectional plan showing the circuit connections. Fig. 9 is a fragmentary vertical section showing another construction of magnetic retarder.

My improved meter comprises, first, an electro-dynamometer, which is constructed with a vertical axis A, mounted to move freely and suspended from a torsion-thread. This axis carries, first, one of the bobbins constituting an electro-dynanometer (Watt meter)—such as the bobbin B with fine wire, for example— I I being the bobbins traversed by the main current, and, secondly, it carries a circular metal disk D, by preference of copper, attached by means of rods F to a disk G, fixed on the axis A.

Secondly, the instrument consists of an axis C, preferably placed in line with A, and carrying two or more magnets E E, (permanent magnets being shown in Fig. 1,) so arranged as to form magnetic fields passing through the disk D.

Thirdly, it further consists of an electromotor M, of any suitable form, which puts the axis C in motion by means of toothed gear or otherwise, or it might be mounted directly on the axis C. The parts being thus arranged, if the axis C be turned there will be produced in the disk D local induced currents which will tend to make it revolve at a speed strictly proportional to the speed of the axis C. The same effect may be produced by fixing D on C and E on A.

When the current passes through the electro-dynamometer, it causes the axis A to turn in the direction of the arrow, which direction is opposed to the rotation of the magnets with a force proportional to the strength of the current. If, therefore, the speed of C be regulated by any suitable means so that at each moment the axis A remains in equilibrio under the action of these two opposed forces— namely, the couple exerted by the electro-dynamometer and the couple produced by the induced currents in D—the speed of C will at every moment be proportional to the strength of current passing through the electric dynamometer. It will consequently be sufficient to register the number of revolutions made by C for measuring the energy expanded in the circuit on which the meter is mounted. This regulation is effected by a circuit-closer $t\ s'$, the contact of which is made and broken by the oscillations of B and which controls the passage of the current in the motor M.

The construction of the various above-described parts is as follows: The magnetic fields for acting on the disk D are by preference composed of two series of small V-shaped magnets E, as shown in detail at Fig. 3. These series of magnets, of which four are shown, are placed, respectively, above and below the disk, the poles of opposite sign being arranged opposite each other, so as to form twice four magnetic fields passing through D. Each series is mounted upon a piece which can be shifted on the axis C, and the regulation can be effected by moving the two sets of magnets to or from each other. The advantage of this arrangement is that a very powerful effect is produced by means of magnets of comparatively small mass, and if any one of these should vary in power this variation amounts only to one-half of four in the regulation.

The motor M, Figs. 1 and 2, consists of two fixed bobbins N, forming induction-coils, and of three fixed bobbins N' on an iron plate $n$, mounted on the axis forming the armature. These bobbins are connected to a commutator with three contacts, on which slide the brushes. A fly-wheel V is mounted on the axis $m$ for rendering the motion uniform.

The axis A, on the mobility of which the susceptibility of the apparatus depends, is suspended on a torsion-thread, which must be made of such fineness that the torsion couple which it exerts can be neglected. For preventing the breaking of such a thread in consequence of shocks and compensating for its extension the arrangement shown at Fig. 4 may be used. The fine thread $a$, by preference of silver wire, is fixed at $a'$ to the lower part of the hollow axis A and at $a^2$ to a nipper A', which can slide with slight friction in its support and carries a cross-piece $A^4$. (Shown in plan at Fig. 5.) The axis A has at its lower part a reduced end guided and entered in an adjustable bush $a^3$, Fig. 1. The nipper A' is supported by a spring $A^2$, forming a lever under the piece $A^4$, and which is regulated by means of the screw $A^3$. The spring $A^2$ is raised until the piece $A^4$ approaches close to the head of the rod $a^4$. This rod is fixed to the milled button $x$. By this means in the case of a shock the spring $A^2$ is deflected and the thread $a$ can only be subjected to a tension equal to that of $A^2$. The button $x$ and the rod $a^4$, which is engaged in a slot of $A^4$, as shown at Fig. 5, serve to impart more or less twist to the thread in case of want of proper equilibrium, so that the effort exerted by the thread will not influence the bobbin B when no current is passing—that is to say, when the meter does not register.

The current-regulator of the motor must regulate the speed of the latter in such manner as to constantly maintain the axis A in equilibrio—that is to say, it must produce an increase of current when the action of the electro-dynamometer preponderates and a reduction in the contrary case. These variations should be produced at the slightest movements of the axis A in order to prevent exaggerated oscillations. For obtaining perfect regularity a fly-wheel of sufficient mass is placed on the axis of the motor and the arrangement of regulator or circuit-closer (shown in plan at Fig. 6) is adopted, which avoids sparking on breaking contact in an almost perfect manner. A contact-pin $t$, mounted upon A, carries with it in the motion of A an insulating-piece S, Fig. 6, pivoted at S' and formed with an arm $t''$ at its end and carrying a contact-spring $s'$ and a reinforcing-spring $t'$, the pin $t$ working loosely between $t''$ and $s'$ to move the piece S, and by making or breaking contact with $s'$ constituting the circuit-closer $t\ s'$, before referred to. This piece S carries two contact-springs or flexible blades $s$ and $s'$, which by the displacement of S are respectively in contact, the first with the studs 1 or 2, the second with the studs 3 or 4. These four studs are fixed, and studs 2, 3, and 4 are electrically connected with the motor M, as shown at Fig. 6. The stud 1 is insulated. The studs 2 and 3 communicate with M through the resistances R and R', which are assumed to be equal, and the stud 4 communicates directly with M. The blade $s$ is electrically connected to the circuit by wire 40 to the pivot of S and by connection 41 in S, these connections being permanent. The contact $t$ is connected through axis A to wire 42, and when it touches $s'$ the current passes through the latter to contact-stud 3 and 4. S being situated to the left hand and moving to the right, the contacts of $s$ and $s'$ with their studs will be made in the following order:

$$1\text{st} \begin{cases} s-1 \\ s'-3 \end{cases} \quad 2\text{d} \begin{cases} s-2 \\ s'-3 \end{cases} \quad 3\text{d} \begin{cases} s-2 \\ s'-4 \end{cases}$$

Fig. 7 shows a diagram of the value of the current in M, according to the position of A.

When no current passes through the electro-dynamometer, S is in the position No. 1, and as one branch of the circuit is broken at $t\ s'$ and the other at $s-1$ the circuit of the motor is interrupted. If A moves to the right, the contact $t\ s'$ is made, the circuit of the motor being then—

$+ A\ t\ s'\ 3\ R'\ M$—value 1, Fig. 7.

When S, moved by $t$, comes into the position No. 2, the circuit becomes—

$+ \begin{Bmatrix} A\ t\ s'\ 3\ R' \\ S'\ s\ 2\ R \end{Bmatrix} M$—value 2, Fig. 7.

the interposed resistance becomes $\frac{R}{2}$ as R-R'.

Lastly, when S comes into position 3 the resistances R and R' are short-circuited and the circuit becomes—

$+ A\ t\ s'\ 4\ M$—value 3, Fig. 7.

When A moves to the left, the contact $t\,s'$ is broken and the circuit becomes $s-2\,\mathrm{R\,M}$ until it reaches the extreme left, when it is broken at $s-2$. The current consequently drops suddenly to the value 1 until S passes from the position 2 to the position 1, where it becomes zero. It will be seen that by this arrangement the current is always greater during the oscillation to the right than during the corresponding oscillation to the left, and that the breaking of the circuit only occurs when one of the resistances R or R' is interposed in the circuit of the motor.

In the normal working of the apparatus the axis A assumes automatically a slight oscillating movement in a position such that the mean intensity of the current in the motor is that which imparts to it the required speed for maintaining the axis A in equilibrio. For diminishing the sparking still further a considerable resistance without self-induction may be placed on a shunt-circuit of the motor-circuit.

The registering mechanism consists of a counter of suitable construction, actuated by C or M. Resistances might also be introduced in the shunt-circuit of the electro-dynamometer, or the proportional speed between M and the counter may be varied for adjusting the instrument.

Fig. 8 is a sectional plan showing the arrangement of the meter on a circuit and the direction of the shunt-currents passing to the electro-dynamometer, to the regulator of current, and to the motor.

The advantages of the above-described construction of apparatus are as follows:

First. All the passive resistances such as mentioned above are in this case overcome by the motor and do not produce errors.

Second. Whatever be the effect exerted by the electro-dynamo meter, the motor is set in motion as soon as the contact $t\,t'$ is made and with a power which may be as great as desired.

Third. When in consequence of the slight variations in the speed of C the bobbin assumes an oscillating motion, the friction to be overcome by the axis A will not cause any sensible error, as they cause sometimes an acceleration and at other times a diminution in the speed of the motor. These oscillations are, however, only to the extent of a few degrees, and do not alter appreciably the proportions of the efforts of the electro-dynamometer. The magnets E E might be replaced by electro-magnets E' E', as at Fig. 9, mounted either in series or in shunt on the bobbin-circuit of the electro-dynamometer for continuous currents or excited by a separate source of current. Two cases may arise, according to the saturation of the cores of the electro-magnets. If the cores are sufficiently small for them to be saturated with the normal potential difference between the terminals of the apparatus, the variations of voltage will only slightly vary their magnetic field and the meter will be an energy-meter, as before, less exact, but possibly of more constant regulation. If, on the other hand, sufficiently large cores are used for making the magnetic field proportional to the current, it will readily be seen that the indications of the meter will be nearly independent of this potential difference, particularly if the electro-magnets are placed in series with the bobbin B and are traversed by the same current. The couple exerted by the electro-dynamometer will be proportional to the magnetic field produced by B. The couple produced by the current induced in D is proportional to these currents and consequently to the magnetic fields passing through the disk. The existing equilibrium will consequently not be altered by the variations of potential differences, which modify in the same ratio the two opposite forces applied to A. For the same reasons the current to be measured may be made to pass through all the bobbins B, I, and E'. By this means, therefore, there will be obtained for continuous currents a meter of quantity of current or ampère-hours. A volt-hour meter might be constituted by causing a constant current to pass through the frames I and the electro-magnets E', Fig. 9, and in connecting the ends of the wire of bobbin B to the points where the difference of potential to be measured varies.

In all the cases the current will be supplied to the electro-magnets E' by means of two brushes sliding on two insulated rings $l\,l'$, mounted on the axis C. (See Fig. 9.)

The same system of meter with magnets can be used for measuring alternating currents by suitably arranging the motor for this purpose.

The arrangement shown at Figs. 1 and 2 of a disk moving between revolving magnetic fields permits of the construction of a very simple speed-indicator. It is sufficient to cause an opposing force to act upon the disk, and if this force is proportional to the angular displacement of the axis A—such as would be the case with a helical spring, for instance—the divisions of the scale proportional to the speed would be equidistant.

If in the apparatus at Figs. 1 and 2 the electro-dynamometer be replaced by a torsional spring fixed on the one hand to the axis A and on the other hand adjustably connected to a graduated scale, there will be obtained a speed-regulator which may be instantly regulated for any given speed.

My improved meter may be used for either continuous or alternating currents. The armature D may be variously modified in form, it being immaterial whether it be in the form of a disk, cylinder, wire coil, &c. It is only essential that it be a closed conductor movable in the field of the magnets E E on the general principle of the "Faraday" disk dynamo.

Having now particularly described and ascertained the nature of my said invention and in what manner the same is to be performed, I declare that what I claim is—

1. An electric meter consisting of the combination of an electro-dynamometer, an electromotor, and a retarder consisting of two relatively-movable members, the one connected to the dynamometer to be oscillated thereby and the other connected to the motor to be rotated thereby and the two being relatively constructed to cause the rotative one to exert a propulsive effort upon the other, which is resisted by said dynamometer.

2. An electric meter consisting of the combination of an electro-dynamometer, an electromotor, a retarder consisting of two relatively-movable members, the one connected to the dynamometer to be oscillated thereby and the other connected to the motor to be rotated thereby, and a current-regulator for controlling said motor operated by the dynamometer.

3. An electric meter consisting of the combination of an electro-dynamometer, an electromotor, and a magnetic retarder consisting of a movable magnet and a movable closed armature rotative relatively to the magnet in the field thereof, the one connected to the dynamometer to be oscillated thereby and the other connected to the motor to be rotated thereby and both influenced, but oppositely to each other, by the current to be measured.

4. An electric meter consisting of the combination of an electro-dynamometer, an electromotor, and a magnetic retarder consisting of a movable magnet and a movable closed armature rotative relatively to the magnet in the field thereof, the one connected to the dynamometer to be oscillated thereby and the other connected to the motor to be rotated thereby, and a current-regulator for controlling the speed of the motor operated by the dynamometer.

5. An electric meter consisting of the combination of an electro-dynamometer, an electromotor, and a magnetic retarder consisting of a movable magnet and a movable closed armature rotative relatively to the magnet in the field thereof, the one connected to the dynamometer to be oscillated thereby and the other connected to the motor to be rotated thereby, and a current-regulator for controlling the speed of the motor, operated by the dynamometer and consisting of a circuit-closer and a resistance, the former constructed to first introduce and then short-circuit the resistance when moved by an increase of current through the dynamometer and to first introduce the resistance and then break the circuit when moved by a decrease of current.

6. An electric meter consisting of the combination of an electro-dynamometer, an electromotor, and a magnetic retarder consisting of a movable magnet and a movable closed armature rotative relatively to the magnet in the field thereof, the one connected to the dynamometer to be oscillated thereby and the other connected to the motor to be rotated thereby, and a current-regulator for controlling the speed of the motor, operated by the dynamometer and consisting of a circuit-closer and two resistances, the circuit-closer constructed when moved by an increase of current through the dynamometer to first introduce one resistance in series with the motor, then both in derivation, and finally to short-circuit both, and vice versa, when moved by a decrease of current.

7. An electric meter consisting of the combination of an electro-dynamometer, an electromotor, and a magnetic retarder consisting of magnets carried by an axis rotated by the motor and a disk armature in the field of said magnets carried by an axis oscillated by the dynamometer, whereby the rotation of the magnets by the motor at varying speeds exerts a proportionally-varying effort against said armature, and hence against the dynamometer.

8. An electric meter consisting of the combination of an electro-dynamometer, an electromotor, and a magnetic retarder consisting of electro-magnets carried by an axis rotated by the motor and a disk armature in the field of said magnets carried by an axis oscillated by the dynamometer, said magnets having normally undersaturated cores and excited by a current varying proportionally to the variations in the current being measured.

9. The combination, with an electro-dynamometer and an electromotor, of a current-regulator for the latter, consisting of a movable part actuated by the former, two resistances, fixed contacts, contact-springs carried by said movable part in separate branch circuits, and circuit-breaking contacts between said movable part and dynamometer located in one of said branch circuits, substantially as and to the effect specified.

10. A speed indicator or regulator consisting of a rotative axis driven at or proportional to the speed to be measured, magnets carried thereby, a closed armature in the field thereof, and an oscillative axis carrying said armature and oscillating against a resisting force, whereby the degree of its oscillation is proportional to the speed of the magnets.

In witness whereof I have hereunto signed my name in the presence of two subscribing witnesses.

LUCIEN VICTOR BRILLIÉ.

Witnesses:
R. M. HOOPER,
CHARLES MARDELET.